(12) United States Patent
Hoshide et al.

(10) Patent No.: US 10,371,202 B2
(45) Date of Patent: Aug. 6, 2019

(54) ROLLING GUIDE DEVICE

(71) Applicant: THK CO., LTD., Tokyo (JP)

(72) Inventors: Kaoru Hoshide, Tokyo (JP); Toshiro Tojo, Tokyo (JP); Yoshiyuki Honjo, Tokyo (JP); Ryuji Furusawa, Tokyo (JP); Ayako Miyajima, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/070,430

(22) PCT Filed: Jan. 11, 2017

(86) PCT No.: PCT/JP2017/000547
§ 371 (c)(1),
(2) Date: Jul. 16, 2018

(87) PCT Pub. No.: WO2017/126371
PCT Pub. Date: Jul. 27, 2017

(65) Prior Publication Data
US 2019/0024713 A1 Jan. 24, 2019

(30) Foreign Application Priority Data
Jul. 28, 2016 (JP) .................................. 2016-148712

(51) Int. Cl.
*F16C 29/06* (2006.01)
*F16C 41/00* (2006.01)
*F16C 33/10* (2006.01)

(52) U.S. Cl.
CPC .......... *F16C 29/06* (2013.01); *F16C 33/1045* (2013.01); *F16C 41/00* (2013.01); *F16C 29/0664* (2013.01); *F16C 2233/00* (2013.01)

(58) Field of Classification Search
CPC ..... F16C 29/06; F16C 41/007; F16C 2233/00
See application file for complete search history.

(56) References Cited

U.S. PATENT DOCUMENTS 6,203,199 B1    3/2001  Pfeuffer
6,333,628 B1 *  12/2001 Yeh ...................... F16C 29/005
                                                    324/207.24
(Continued)

FOREIGN PATENT DOCUMENTS

JP    2000-35040 A    2/2000
JP    2005-121215 A   5/2005
(Continued)

OTHER PUBLICATIONS

Machine Translation of JP2015-152026.*
(Continued)

*Primary Examiner* — Thomas R Hannon
(74) *Attorney, Agent, or Firm* — Westerman, Hattori, Daniels & Adrian, LLP

(57) ABSTRACT

Provided is a rolling guide device which is capable of directly recognizing an operation condition of a moving member with respect to a track member or a circulation state of rolling elements in an endless circulation path, the rolling guide device including: a track member having a rolling surface; and a moving member, which is assembled to the track member through intermediation of a large number of rolling elements which roll on the rolling surface, and has an endless circulation path for the rolling elements, the moving member including: a main body member having a load rolling surface and a no-load return path for the rolling elements, the load rolling surface being opposed to the rolling surface of the track member to define a load path for the rolling elements, a pair of covers, which have direction change paths for allowing the rolling elements to move between the load path and the no-load return path, and is mounted to the main body member; and a measurement plate, which is interposed at least between the main body member and one cover to form part of the endless circulation path, and has a mounting portion for a sensor configured to (Continued)

detect an operation condition of the moving member with respect to the track member.

3 Claims, 2 Drawing Sheets

(56) References Cited

U.S. PATENT DOCUMENTS

| | | | |
|---|---|---|---|
| 7,096,595 B2 | 8/2006 | Greubel | |
| 7,178,981 B2 * | 2/2007 | Rudy | F16C 29/0609 |
| | | | 384/45 |
| 7,547,141 B2 * | 6/2009 | Chen | F16C 29/00 |
| 8,011,832 B2 * | 9/2011 | Menges | F16C 41/00 |
| | | | 384/45 |
| 9,863,478 B2 * | 1/2018 | Sakagami | F16C 41/007 |

FOREIGN PATENT DOCUMENTS

| | | |
|---|---|---|
| JP | 2008-175315 A | 7/2008 |
| JP | 2014-47793 A | 3/2014 |
| JP | 2015-152026 A | 8/2015 |

OTHER PUBLICATIONS

International Search Report dated Mar. 21, 2017, issued in counterpart International Application No. PCT/JP2017/000547 (2 pages).

* cited by examiner

ROLLING GUIDE DEVICE

TECHNICAL FIELD

The present invention relates to a rolling guide device, which is configured to guide a movable body such as a table so as to be reciprocable on a linear guide portion or a curved guide portion of industrial machines such as machine tools or various conveying devices.

BACKGROUND ART

Hitherto, a rolling guide device of this type includes a track member and a moving member. The track member has a rolling surface for rolling elements, which extends along a longitudinal direction of the track member. The moving member is assembled to the track member through intermediation of a large number of rolling elements which roll on the rolling surface, and is reciprocable along the track member. The moving member has a load rolling surface on which the rolling elements roll while bearing a load. The load rolling surface is opposed to the rolling surface of the track member to define a load path for the rolling elements. Further, the moving member has no-load paths for allowing the rolling elements to circulate from one end to another end of the load path. The load path and the no-load paths are continuous with one another to define an endless circulation path for the rolling elements. With such a configuration, the moving member is movable along the track member without being limited in stroke thereof.

A product lifetime of the rolling guide device mainly depends on fatigue in the rolling surface of the track member ox the load rolling surface of the moving member. However, when the rolling surface and the load rolling surface as well as the rolling elements such as balls or rollers which roll thereon are not appropriately lubricated with lubricant, flaking of the rolling surface or the load rolling surface may occur early, with the result that the product lifetime of the rolling guide device is shortened. When lubrication defect occurs, rolling resistance of the rolling elements increases. As a result, there is a fear in that, for example, acceleration of the table which is movably supported by the rolling guide device is degraded, that is, the rolling guide device cannot exert its original performance.

Meanwhile, the rolling guide device is applicable to various uses, and a lubrication state of the rolling surface or other part is inevitably affected by, for example, a use environment and an applied load depending on the use (hereinafter referred to as "use condition"). Thus, in order to allow the rolling guide device to exert its original performance and fulfill its product lifetime, it is desired that an operation condition of the rolling guide device be continuously detected by various sensors and that supply of the lubricant be controlled based on results of detection. Further, it is also desired that an operation of an industrial machine having the rolling guide device incorporated therein be controlled as needed.

Patent Literature 1, there is disclosed an example in which a sensor configured to detect presence of lubricant on the track member is mounted to the moving member. However, the sensor is mounted on an outer side of the moving member. Thus, even though the fact of whether or not the lubricant adheres to the track member can be checked, a lubrication state and a circulation state of the rolling elements in the endless circulation path of the moving member cannot be directly recognized.

CITATION LIST

Patent Literature

[PTL 1] JP 2005-121215 A

DISCLOSURE OF THE INVENTION

Problems to be Solved by the Invention

The present invention has been made in view of the above-mentioned problem, and has an object to provide a rolling guide device which is capable of incorporating therein various sensors configured to detect an operation condition of a moving member with respect to a track member, and of directly recognizing a circulation state of rolling elements in an endless circulation path through use of the various sensors.

Means for Solving the Problems

That is, according to one embodiment of the present invention, there is provided a rolling guide device, including: a track member having a rolling surface extending along a longitudinal direction of the track member; and a moving member, which is assembled to the track member through intermediation of a large number of rolling elements which roll on the rolling surface so that the moving member is movable along the track member, and has an endless circulation path for the rolling elements. Further, the moving member includes: a main body member having a load rolling surface and a no-load return path for the rolling elements, the load rolling surface being opposed to the rolling surface of the track member to define a load path for the rolling elements, the no-load return path being parallel to the load path; a pair of covers, which have direction change paths for allowing the rolling elements to move between the load path and the no-load return path, and is mounted to both ends of the main body member in a moving direction of the main body member; a measurement plate, which is interposed at least between the main body member and one cover to form part of the endless circulation path, and has a mounting portion for a sensor configured to detect an operation condition of the moving member with respect to the track member.

Effects of the Invention

According to the present invention, the measurement plate is present between the main body member and the cover of the moving member, and the measurement plate has a mounting portion for various sensors configured to detect an operation condition of the moving member with respect to the track member. Therefore, the rolling guide device having various sensors incorporated therein can easily be provided. Further, the measurement plate forms part of the endless circulation path for the rolling elements. Thus, with the various sensors mounted to the measurement plate, the circulation state of the rolling elements in the endless circulation path can be directly recognised. Therefore, an appropriate lubrication environment depending on a use condition of the rolling guide device can be set.

MODE FOR CARRYING OUT THE INVENTION

Now, detailed description is made of a rolling guide device according to one embodiment of the present invention with reference to the accompanying drawings.

Figure 1:
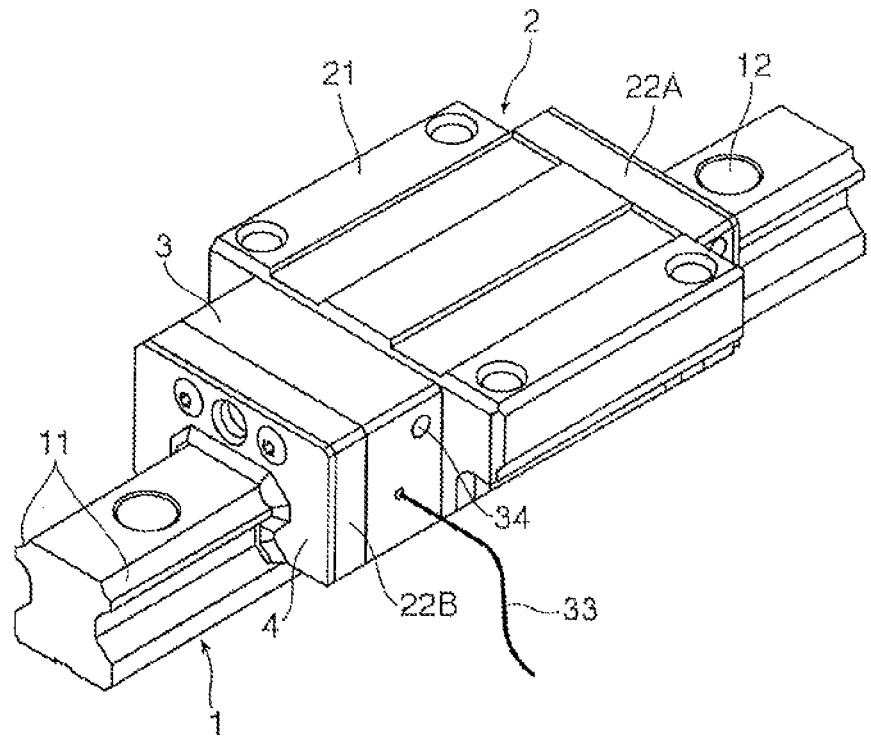
FIG. 1 is a perspective view for illustrating an example of a rolling guide device to which the present invention is applicable.

FIG. 1 is a perspective view for illustrating an example, of a rolling guide device to which the present invention is applicable. The rolling guide device includes a track member 1 and a moving member 2. The track member 1 extends linearly. The moving member 2 is assembled to the track member 1 through intermediation of a large number of balls being rolling elements. The track member 1 is laid on a fixed portion of various machine tools, and a movable body of a type among various types is mounted to the moving member 2, thereby being capable of guiding the movable body along the track member 1 in a freely reciprocable manner.

The track member 1 is formed into an elongated body having a substantially rectangular cross section. The track member 1 has a plurality of bolt mounting holes 12, which are arrayed at predetermined intervals in a longitudinal direction and each penetrate from an upper surface to a bottom surface. With use of fixing bolts inserted into the bolt mounting holes 12, the track member 1 can be rigidly fixed to a fixing portion. On both right and left side surfaces of the track member 1, there are formed two rolling surfaces 11 for the rolling elements. The track member has four rolling surfaces 11 as a whole. The number of rolling surfaces 11 formed on the track member 1 is not limited to four.

Meanwhile, the moving member 2 mainly includes a main body member 21 made of metal, a pair of covers 22A and 22B made of synthetic resin, and a measurement plate 3. The pair of covers. 22A and 22B are mounted to both ends of the main body member 21 in a moving direction of the main body member 21. The measurement plate 3 is interposed between one cover 22B and the main body member 21. The moving member 2 has a plurality of endless circulation paths for the balls so as to correspond to the rolling surfaces 11 of the track member 1. Further, seal members 4, which are configured to seal gaps between the moving member 2 and the track member 1 are fixed to the covers 22A and 22B, thereby preventing dust or the like adhering to the track member 1 from entering the endless circulation paths.

Figure 2:
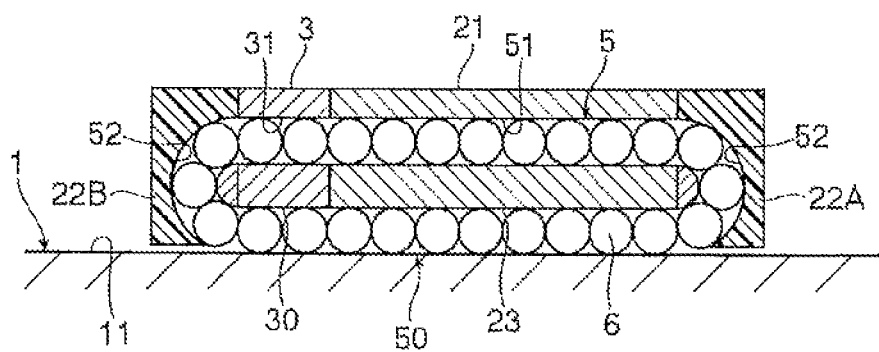
FIG. 2 is a sectional view for illustrating a configuration of an endless circulation path for balls.

FIG. 2 is a sectional view for illustrating the endless circulation path. As illustrated in FIG. 2, the endless circulation path 5 includes a load path 50, a return path 51, and a pair of direction change paths 52. Further, part of the endless circulation path 5 is formed also; in the measurement plate 3. The main body member 21 forming the moving member 2 has a load rolling surface 23 opposed to the rolling surface 11 of the track member 1, and the rolling elements 6 roll while bearing a load between the rolling surface 11 of the track member 1 and the load rolling surface 23 of the main body 21. In the endless circulation path 5, a path portion in which the rolling elements 6 roll while bearing the load corresponds to the load path 50. Further, the main body member 21 has the return path 51 extending parallel to the load path 50. Typically, the return path 51 is formed so as to penetrate through the main body member. 21, and an inner diameter of the return, path 51 is set so as to be slightly larger than a diameter of the rolling elements 6. With such a configuration, the rolling elements 6 roll in the return path without bearing the load.

The measurement plate 3 has a no-load communication path 30 and a communication return path 31. The no-load communication path 30 is continuous with the load path 50 of the main body member 21. The communication return path 31 is continuous with the return path 51 of the main body member 21. The rolling elements 6 roll in a no-load state without bearing the load in any of the no-load communication path 30 and the communication return path 31.

The direction change paths 52 are formed in the pair of covers 22A and 22B, respectively. One cover 22A is fixed to an end surface of the main body member 21. The direction change path 52 of the cover 22A connects an end portion of the load path 50 and an end portion of the return path 51 to each other, and allows the rolling elements 6 to move therebetween. Another cover 22B is fixed to the main body member through intermediation of the measurement plate 3. The direction change path 52 of the cover 22B connects an end portion of the no-load communication path 30 and an end portion of the communication return path 31 of the measurement plate 3 to each other, and allows the rolling elements 6 to move therebetween.

Thus, when the measurement, plate 3 and the pair of covers 22A and 22B are fixed to the main body member 21, the endless circulation path 5 for the rolling elements 6, which includes the no-load communication path 30 and the communication return path 31 of the measurement plate 3, is brought to completion. In the endless circulation path 5, the rolling elements 6 roll while bearing the load only in the load path 50 defined by the load rolling surface 23 of the main body member 21 and the rolling surface 11 of the track member 1 which are opposed to each other.

Figure 3:
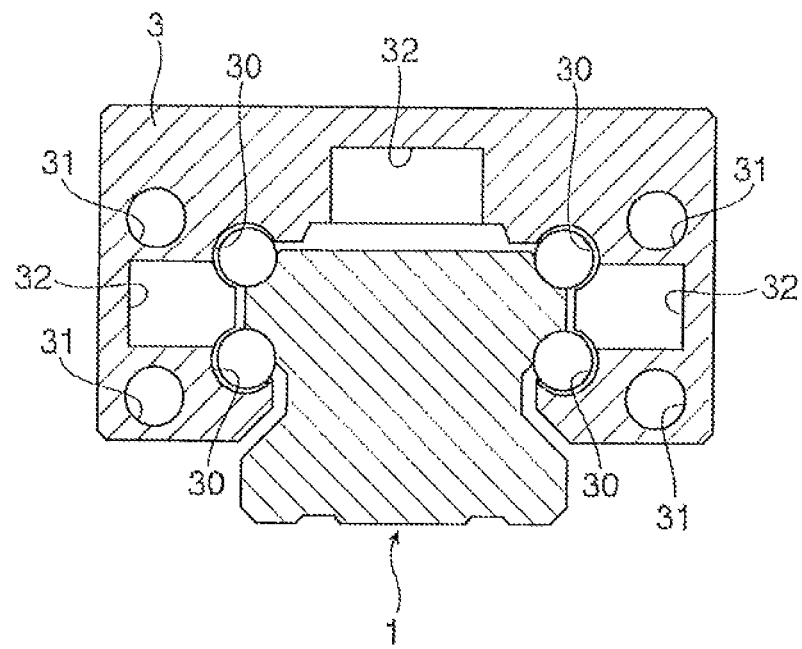
FIG. 3 is a sectional view for illustrating a schematic configuration of a measurement plate in a first embodiment of the present invention.

FIG. 3 is an illustration of the measurement plate 3 in a first embodiment of the present invention, and is a sectional view of the measurement plate taken along a plane perpendicular to the longitudinal direction of the track member 1. The measurement plate 3 has spaces inside thereof serving as mounting portions 32 for various sensors, and a plurality of types of sensors can be fixed to the mounting portions 32. Further, as illustrated in FIG. 1, signal cables 33 of the plurality of sensors accommodated in the mounting portions 32 are bundled into a single cable, led out from the measurement, plate 3, and connected to a controller (not shown). FIG. 3 is a schematic illustration of the presence of the mounting portions 32 for the various sensors, and specific positions and shapes of the mounting portions 32 in the measurement plate 3 may suitably be changed depending on objects to be measured by the sensors to be used.

Examples of the sensors to be accommodated in the mounting portions 32 include a contamination sensor configured to detect contamination of the lubricant, a measurement head of a linear encoder configured to measure the amount of movement of the moving member with respect to the track member, and an acceleration sensor. Further, more in detail, for the contamination sensor, there may be used a particle counter of a photoelectric conversion type using laser light, a moisture-in-oil sensor of an infrared wavelength absorption type, a measurement sensor for a degradation level of lubricating oil using dielectric constant, a measurement sensor for iron powder concentration in lubricating oil, and a measurement sensor for a degradation level of lubricating oil using hue discrimination, and various sensors for recognition of a contamination state of lubricating oil may suitably be accommodated in the mounting portions 32 of the measurement plate 3.

Further, the measurement plate 3 forms part of the endless circulation path 5, and hence supply of lubricant with respect to the rolling elements 6 which roll in the endless circulation path 5 can be performed with the measurement plate 3. Specifically, a supply port 34 (see FIG. 1) for lubricant is formed in the measurement plate 3, and a lubricant path extending from the supply port 34 to the no-load communication path 30 or communication return path 31 is formed. A tube such as a flexible tube is connected to the supply port 34, and the lubricant is supplied to the supply port 34 from a lubricant pump provided outside the device.

In this case, a sensor configured to recognise a flow of the lubricant in the lubricant path can be provided to the measurement plate 3. With such a sensor, a supply state of the lubricant with respect to the endless circulation path 5 can be monitored in a substantially accurate manner. As a result, insufficient lubrication for the rolling surface 11 of the track member 1 or the load rolling surface 23 of the moving member 2 can be prevented.

The rolling guide device according to the embodiment described with reference to the drawings is of a type in which the track member is laid on the fixed portion. However, the present invention is also applicable to a rolling guide device such as a ball-spline device or a ball screw device of a type in which the track member is formed into a rod shaft shape such that only both ends thereof are supported by the fixed portion. Further, the present invention is also applicable to a rolling guide device which is incorporated into various actuators.

Figure 4:
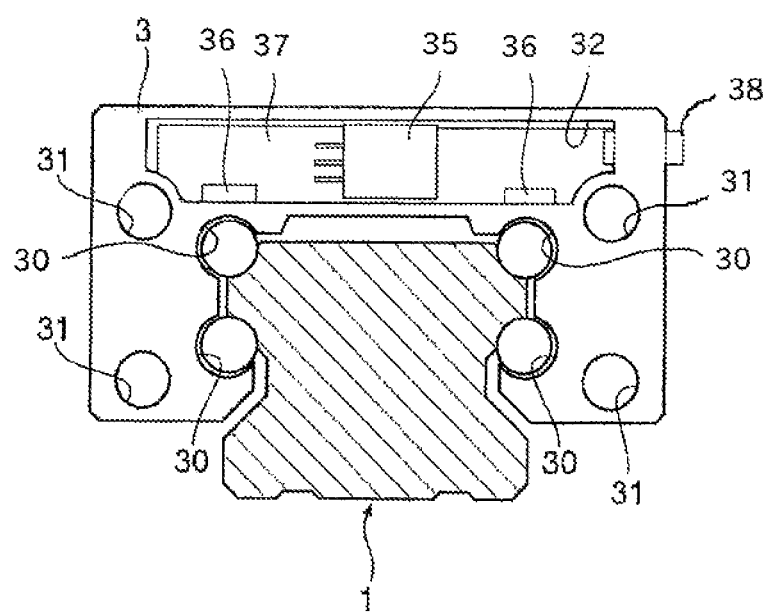
FIG. 4 is a front view for illustrating a measurement plate in a second embodiment of the present invention.

FIG. 4 is an illustration of the measurement plate in a second embodiment of the present invention, and is a front view for illustrating the measurement plate 3 as seen from a joint surface side with respect to the main body member 21.

The measurement plate 3 has a mounting portion 32 which is opened toward the main body member 21. A vibration sensor 35 and a plurality of proximity sensors 36 are accommodated in the mounting portion 32. The vibration sensor 35 and the proximity sensors 36 are mounted to an electronic board 37, and is accommodated in the mounting portion 32 together with the electronic board 37. Further, a connector 38 for outputting a signal to an outside of the measurement plate 3 and supplying power to the electronic board 37 is connected to the electronic board 37, and the connector 38 is provided so as to penetrate through the measurement plate 3.

An acceleration sensor can be used as the vibration sensor 35. The vibration sensor 35 is held in abutment against the main body member 21 of the moving member 2 under a state in which the vibration sensor 35 is accommodated in the mounting portion 32 of the measurement plate 3. Specifically, the vibration sensor 35 is directly bonded to the end surface of the main body member 21 to which the measurement plate 3 is fixed. Further, the proximity sensors 36 are fixed to an inner wall of the mounting portion 32 at positions adjacent to the no-load communication paths 30 of the measurement plate 3. In the example illustrated in FIG. 4, the proximity sensors 36 are provided with respect to two no-load communication paths 30 arranged in the vicinity of the mounting portion 32.

A microcontroller serving as a controller including a RAM and a ROM is mounted to the electronic board 37. Detection signals from the vibration sensor 35 and the proximity sensors 36 are input to the controller through, for example, an A/D converter. The controller executes a program stored in advance in the ROM, processes the detection signals from the vibration sensor and the proximity sensors, and outputs the various signals to the outside through the connector 38. An output destination of the signals generated by the controller may include, for example, an alarm device or a user interface such as a display. It is not always required that the controller be mounted to the electronic board 37 accommodated in the mounting portion 32. Only the sensors 35 and 36 may be accommodated in the mounting portion 32, and the controller provided outside the measurement plate 3 and each of the sensors 35 and 36 may be connected to each other by the connector 38.

The rolling guide device of this type is used, for example, as a part for moving a work table and moving a headstock in a numerically controlled machine tool such as a machining center, and a running state of the rolling guide device may significantly affect the accuracy in processing of a workpiece by the numerically controlled machine tool. Thus, with a configuration in which detection signals of various sensors provided to the measurement plate 3 are directly input to a controller of the numerically controlled machine tool, the operation of the numerically controlled machine tool can be controlled based on the detection signals, which is effective for reduction in rate of occurrence of products with defective machining.

As described above, according to one embodiment of the present invention, the measurement plate 3 is interposed between the main body member 21 forming the moving member 2 and the cover 22B, and the mounting portions 32 for the various sensors are formed in the measurement plate 3. Therefore, the various sensors for recognizing an operation condition of the rolling guide device can easily be integrated to the moving member 2. Further, through use of the detection results of the sensors, the operation state of the rolling guide device can be monitored in a real-time manner, thereby being capable of maintaining the best state of operations of various industrial machines using the rolling guide device.

Further, the measurement plate 3 forms part of the endless circulation path 5 for the rolling elements 6. Therefore, the circulation state of the rolling elements 6 in the endless circulation path 5 can be directly recognized with use of the sensors provided in the measurement plate 3, thereby being capable of setting appropriate supply timings of the lubricant, a supply time period of the lubricant, a supply amount of the lubricant, and intensive supply positions of the lubricant on the track member 1, depending on the use conditions of the rolling guide device. With this configuration, the operation state of the rolling guide device can always be maintained at a high level.

In the rolling guide device according to the embodiments described with reference to the drawings, the balls are used as the rolling elements. However, the present invention is also applicable to a rolling guide device using rollers.

The invention claimed is:

1. A rolling guide device, comprising:
    a track member having a rolling surface extending along a longitudinal direction of the track member; and
    a moving member, which is assembled to the track member through intermediation of a large number of rolling elements which roll on the rolling surface so that the moving member is movable along the track member, and has an endless circulation path for the rolling elements,
    the moving member including:

a main body member having a load rolling surface and a no-load return path for the rolling elements, the load rolling surface being opposed to the rolling surface of the track member to define a load path for the rolling elements, the no-load return path being parallel to the load path;

a pair of covers, which have direction change paths for allowing the rolling elements to move between the load path and the no-load return path, and is mounted to both ends of the main body member in a moving direction of the main body member;

a measurement plate, which is interposed at least between the main body member and one cover to form part of the endless circulation path, and has a mounting portion for a sensor configured to detect an operation condition of the moving member with respect to the track member.

2. The rolling guide device according to claim 1, wherein the measurement plate has:
   a no-load communication path, which is opposed to the rolling surface of the track member, and is configured to guide the rolling elements between the load path and the direction change paths; and
   a communication return path configured to guide the rolling elements between the return path of the main body member and the direction change path of the cover.

3. The rolling guide device according to claim 1, wherein the measurement plate has a supply port to which a supply tube for lubricant is connected and a lubricant path extending from the supply port and being configured to supply lubricant to the rolling surface of the track member or to the rolling elements.

* * * * *